United States Patent
Choi et al.

(10) Patent No.: US 12,115,969 B2
(45) Date of Patent: Oct. 15, 2024

(54) METHOD FOR CONTROLLING POWERTRAIN OF HYBRID VEHICLE

(71) Applicants: Hyundai Motor Company, Seoul (KR); Kia Corporation, Seoul (KR)

(72) Inventors: Sung Mu Choi, Gyeonggi-do (KR); Ji Ho Cho, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 289 days.

(21) Appl. No.: 17/728,397

(22) Filed: Apr. 25, 2022

(65) Prior Publication Data

US 2023/0041675 A1 Feb. 9, 2023

(30) Foreign Application Priority Data

Aug. 3, 2021 (KR) .................. 10-2021-0102193

(51) Int. Cl.
*B60W 20/20* (2016.01)
*B60W 20/40* (2016.01)

(52) U.S. Cl.
CPC ............ *B60W 20/20* (2013.01); *B60W 20/40* (2013.01); *B60W 2510/0614* (2013.01); *B60W 2510/0676* (2013.01); *B60W 2510/068* (2013.01)

(58) Field of Classification Search
CPC ................. B60W 20/20; B60W 20/40; B60W 2510/0614; B60W 2510/0676; B60W 2510/068
See application file for complete search history.

(56) References Cited

U.S. PATENT DOCUMENTS

| 6,421,599 | B1 * | 7/2002 | Lippa | F02D 41/027 60/285 |
| 6,464,027 | B1 * | 10/2002 | Dage | F01P 3/20 123/41.14 |
| 10,220,828 | B2 * | 3/2019 | Cho | B60K 6/485 |
| 2010/0146938 | A1 * | 6/2010 | Baum | B60W 10/08 477/3 |
| 2019/0331015 | A1 * | 10/2019 | Naumann | F01N 3/2026 |
| 2020/0232359 | A1 * | 7/2020 | Kaack | F01N 11/002 |
| 2021/0215076 | A1 * | 7/2021 | Ellmer | F01N 3/08 |

* cited by examiner

*Primary Examiner* — Gertrude Arthur Jeanglaude
(74) *Attorney, Agent, or Firm* — Fox Rothschild LLP

(57) ABSTRACT

A method for controlling a powertrain of a hybrid vehicle includes the following steps performed by a hybrid controller: determining whether an ambient air temperature is lower than a predetermined temperature; driving a motor and operating a heating disc of an electrically heated catalytic converter disposed in an exhaust pipe of an internal combustion engine during a predetermined operating time when an ambient air temperature is lower than a predetermined temperature; supplying ambient air to the heating disc; and varying a flow rate of the ambient air supplied to the heating disc in response to a temperature change of the heating disc.

8 Claims, 4 Drawing Sheets

METHOD FOR CONTROLLING POWERTRAIN OF HYBRID VEHICLE

CROSS-REFERENCE TO RELATED APPLICATION

This application claims under 35 U.S.C. § 119(a) the benefit of Korean Patent Application No. 10-2021-0102193, filed on Aug. 3, 2021 in the Korean Intellectual Property Office, the entire contents of which are incorporated by reference herein.

BACKGROUND

(a) Technical Field

The present disclosure relates to a method for controlling a powertrain of a hybrid vehicle capable of meeting certain governmental emissions standards by achieving rapid activation of a catalyst.

(b) Description of the Related Art

Eco-friendly vehicles such as hybrid vehicles that can replace internal combustion engine vehicles are increasingly being developed and released. Hybrid vehicles are powered by an internal combustion engine and an electric motor, which uses energy stored in batteries.

In recent years, emissions regulations such as Euro 7 emissions regulations are gradually being strengthened. In order to respond to stricter regulations, it is essential to reduce cold start emissions that occur in a cold start condition, which account for about 80% to 90% of total emissions. To this end, it is recognized that the most important factor is to shorten a light-off time at which a temperature of a catalytic converter reaches an operating temperature called a light-off temperature.

In order to shorten the light-off time in a relatively low ambient temperature condition, such as a cold start condition, an electrically heated catalyst may be provided to a catalyst system of the hybrid vehicle. The electrically heated catalytic converter may include a heating disc provided in a housing, a catalyst substrate disposed downstream of the heating disc, and a catalytic layer coating an outer surface of the catalyst substrate. The heating disc may be heated by electric energy supplied from the batteries, and the heating disc may be operated in a state in which a certain amount of ambient air is supplied. As heat generated by the heating disc is transferred to the catalyst substrate and the catalytic layer through the ambient air, the temperature of the catalytic converter may reach the light-off temperature rapidly, and the cold start emissions generated under the cold start condition may be removed or reduced by the catalytic converter. In particular, as the temperature of the heating disc increases, the emissions may be further reduced.

However, as the operating time of the heating disc of the electrically heated catalytic converter passes, the temperature of the heating disc may increase relatively, and as a flow rate of ambient air supplied to the heating disc is constant at a relatively low flow rate (for example, 5 kg/h), the temperature of the heating disc may increase excessively. In particular, when the temperature of the heating disc rises above a limit temperature (for example, 850° C.), the heating disc may be damaged or broken due to high heat.

In a hybrid vehicle according to the related art, while the heating disc is operating, the flow rate of ambient air supplied to the heating disc cannot be varied, which makes it difficult to optimize the operation of the heating disc.

The above information described in this background section is provided to assist in understanding the background of the inventive concept, and may include any technical concept which is not considered as the prior art that is already known to those skilled in the art.

SUMMARY

An aspect of the present disclosure provides a method for controlling a powertrain of a hybrid vehicle capable of meeting stricter emissions standards by achieving rapid activation of a catalyst and preventing a heating disc of an electrically heated catalytic converter from overheating.

According to an aspect of the present disclosure, a method for controlling a powertrain of a hybrid vehicle including an internal combustion engine and a motor may include the following steps performed by a hybrid controller: determining whether an ambient air temperature is lower than a predetermined temperature; driving the motor and operating a heating disc of an electrically heated catalytic converter disposed in an exhaust pipe of the internal combustion engine during a predetermined operating time when the ambient air temperature is lower than the predetermined temperature; supplying ambient air to the heating disc; and varying a flow rate of the ambient air supplied to the heating disc in response to a temperature change of the heating disc.

When the ambient air temperature is lower than the predetermined temperature, the hybrid vehicle may run in electric vehicle (EV) mode by the motor at an initial driving stage, and the electrically heated catalytic converter and at least one catalytic converter disposed downstream of the electrically heated catalytic converter may rapidly reach a light-off temperature by the heating disc, and thus emissions may be reduced. In particular, the flow rate of the ambient air supplied to the heating disc may be varied in response to the temperature change of the heating disc, and thus thermal durability of the heating disc may be improved.

The method may further include determining whether a temperature of the heating disc exceeds a limit temperature, and the flow rate of the ambient air supplied to the heating disc may be maintained at a first flow rate during a predetermined first operating time when the temperature of the heating disc is lower than or equal to the limit temperature.

Accordingly, the temperature of the heating disc may be prevented from rapidly increasing during the first operating time, and thus the thermal durability of the heating disc may be stably maintained.

The first flow rate may be determined by an air supply device, and the air supply device may be an active purge pump of an active canister purge system.

The ambient air may be supplied to the heating disc at the first flow rate when the active purge pump operates in a state in which an intake valve and an exhaust valve of the internal combustion engine are opened to predetermined degrees.

The active canister purge system may include a canister fluidly connected to an intake pipe of the internal combustion engine, an air isolation valve connected to the canister, and an air inlet connected to the air isolation valve. As the air isolation valve is opened, the ambient air may be supplied to the heating disc through the air inlet, the intake pipe of the internal combustion engine, a combustion chamber of the internal combustion engine, and the exhaust pipe of the internal combustion engine.

The flow rate of the ambient air supplied to the heating disc may be maintained at a second flow rate during a predetermined second operating time when the temperature of the heating disc exceeds the limit temperature, and the second flow rate may be greater than the first flow rate.

When the temperature of the heating disc exceeds the limit temperature, the flow rate of the ambient air supplied to the heating disc may be varied so that the temperature of the heating disc may be stably maintained below the limit temperature. Thus, the thermal durability of the heating disc may be stably maintained.

The second flow rate may be determined by the active purge pump and motoring of the internal combustion engine, and the motoring of the internal combustion engine may be defined as cranking of the internal combustion engine by a starter in a state in which the intake pipe and the exhaust pipe of the internal combustion engine communicate with each other and a fuel is not supplied to the internal combustion engine.

The second flow rate may be the sum of the flow rate of the ambient air supplied by the operation of the active purge pump and the flow rate of the ambient air additionally supplied by the motoring of the internal combustion engine. Since the second flow rate is relatively greater than the first flow rate, the temperature of the heating disc may be lowered below the limit temperature.

According to another aspect of the present disclosure, a non-transitory computer readable medium containing program instructions executed by a processor includes: program instructions that determine whether an ambient air temperature is lower than a predetermined temperature; program instructions that drive the motor and operating a heating disc of an electrically heated catalytic converter disposed in an exhaust pipe of the internal combustion engine during a predetermined operating time when the ambient air temperature is lower than the predetermined temperature; program instructions that supply ambient air to the heating disc; and program instructions that vary a flow rate of the ambient air supplied to the heating disc in response to a temperature change of the heating disc.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
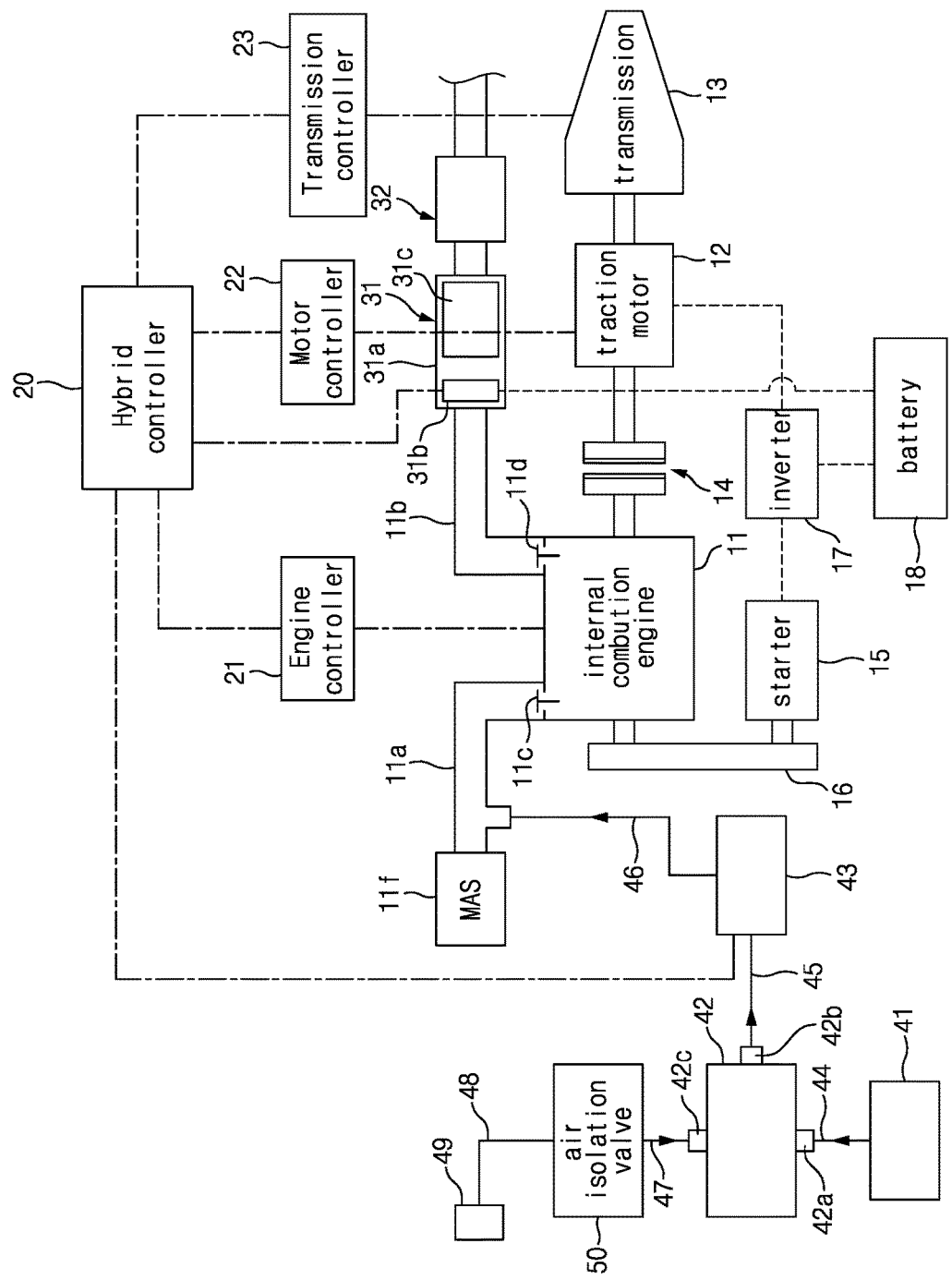
FIG. 1 illustrates a powertrain of a hybrid vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a powertrain 10 of a hybrid vehicle according to an exemplary embodiment of the present disclosure may include an internal combustion engine 11, a motor 12 connected to and separated from the internal combustion engine 11 through a clutch 14, and a transmission 13 connected to the motor 12.

The internal combustion engine 11 may be started by a starter 15. According to an exemplary embodiment of the present disclosure, the starter 15 may be a hybrid starter generator mechanically connected to the internal combustion engine 11 through a belt 16, and electrically connected to a battery 18 through an inverter 17.

The internal combustion engine 11 may be a gasoline engine or a diesel engine, and the internal combustion engine 11 may be controlled by an engine controller 21. The engine controller 21 may transmit instructions to a throttle valve, a fuel injector (not shown), a variable valve timing device (not shown), and the like to control the operation of the internal combustion engine 11.

The motor 12 may be a synchronous motor generator in which a permanent magnet is embedded in a rotor and a stator coil is wound on a stator, and the motor 12 may be controlled by a motor controller 22. The motor controller 22 may transmit an instruction to the motor 12 to control the operation of the motor 12.

The clutch 14 may be mounted between the internal combustion engine 11 and the motor 12. The internal combustion engine 11 may be mechanically connected to and separated from the motor 12 by the engagement and disengagement of the clutch 14.

The transmission 13 may be a multi-stage transmission such as an automatic transmission or a double clutch transmission. The transmission 13 may be configured to shift gears in response to the driver's intentions (vehicle speed, position value of an accelerator pedal, required torque, etc.). The transmission 13 may be controlled by a transmission controller 23.

A hybrid controller 20 may be configured to manage the driving state and overall state of the vehicle, and the hybrid controller 20 may be connected to the engine controller 21, the motor controller 22, and the transmission controller 23 through CAN communications.

The hybrid controller 20 may be configured to check various states such as a driver's request, an engine state, and a battery state, and optimally distribute power according to the vehicle's driving conditions. For example, the hybrid controller 20 may distribute a torque required for a specific driving condition so that two power sources (the engine and an electric motor) may operate most efficiently. For example, the hybrid controller 20 may drive only the motor 12 when the vehicle starts or is in a low-speed section in which efficiency of the motor 12 is high, and may drive only the internal combustion engine 11 in medium/high-speed sections in which efficiency of the internal combustion engine 11 is high. In a section in which high torque is required, such as when the vehicle suddenly accelerates or when the vehicle is driving up a slope, the hybrid controller 20 may drive the internal combustion engine 11 and the motor 12 at the same time.

The hybrid controller 20 may be configured to calculate the driver's acceleration and deceleration requests as torques while the vehicle is driving. An electric brake system (EBS) may calculate a total torque required for braking and an available amount of regenerative braking, and the hybrid controller 20 may transmit an actual amount of regenerative braking to the motor controller 22 considering the state of a hybrid system. For effective power distribution, it is necessary to optimally control the charge state of a high-voltage battery. To this end, the hybrid controller 20 may control the whole hybrid powertrain system to determine the charge and discharge amounts of the high voltage battery and maintain an appropriate charge state. For example, when the state of charge is low, the operation of the motor is restricted to reduce the use of high-voltage power, and at the same time, regenerative braking by the motor and power generation control by the engine may be performed. When the vehicle is stopped due to traffic signals or the like, the hybrid controller 20 may perform an auto stop function to automatically stop the internal combustion engine 11 in order to reduce fuel consumption and exhaust gas. When the auto stop function is turned off, the hybrid controller 20 may restart the internal combustion engine 11 through the starter 15.

The hybrid controller 20 may receive information from the engine controller 21, the motor controller 22, the transmission controller 23, and various sensors, and directly or indirectly transmit control signals to individual actuators of the powertrain 10 through the engine controller 21, the motor controller 22, and the transmission controller 23. The hybrid controller 20 may include a processor and a memory. The processor may receive instructions and data stored in the memory, and transmit the instructions to the actuators. The memory may include a read only memory (ROM), a random access memory (RAM), an electrically programmable read only memory (EPROM), and a high speed clock.

FIG. 1 illustrates a TMED type hybrid vehicle in which the internal combustion engine 11 and the motor 12 of the powertrain 10 are connected through the clutch 14, but without limited thereto, the hybrid vehicle according to exemplary embodiments of the present disclosure may be various types of hybrid vehicles such as FMED type hybrid vehicles and power split type hybrid vehicles.

The internal combustion engine 11 may include an intake pipe 11a allowing the ambient air to suck into a combustion chamber of the internal combustion engine 11 and an exhaust pipe 11b allowing the exhaust gas to be discharged from the combustion chamber of the internal combustion engine 11. A mass airflow sensor 11f may be disposed in the intake pipe 11a, and a plurality of catalytic converters 31 and 32 may be disposed in the exhaust pipe 11b.

At least one of the plurality of catalytic converters may be an electrically heated catalytic converter 31. The electrically heated catalytic converter 31 may include a housing 31a, a heating disc 31b disposed in the housing 31a, and a catalyst element 31c disposed downstream of the heating disc 31b in the housing 31a. The heating disc 31b may generate heat by electric energy received from the battery. The catalyst element 31c may include a catalyst substrate and a catalytic layer coating a surface of the catalyst substrate. For example, the catalyst substrate may be made of a metal material, and the catalytic layer may be made of a noble metal material.

At least one catalytic converter 32 may be disposed downstream of the electrically heated catalytic converter 31, and the catalytic converter 32 may include a housing and a catalyst element disposed in the housing. The catalyst element of the catalytic converter 32 may include a catalyst substrate made of a ceramic material, and a catalytic layer coating a surface of the catalyst substrate. The catalytic layer may be made of a noble metal material.

According to an exemplary embodiment of the present disclosure, when an ambient air temperature T is lower than a predetermined temperature a, the hybrid controller 20 may operate the heating disc 31b of the electrically heated catalytic converter 31, and control an air supply device and the internal combustion engine 11 so that the ambient air may be directed into the electrically heated catalytic converter 31. As the ambient air passes across or through the heating disc 31*b* and the catalyst element 31*c* of the electrically heated catalytic converter 31, and the catalytic converter 32, the heat of the heating disc 31*b* may be transferred to the catalyst element 31*c* and the catalytic converter 32 through the ambient air, and thus the catalyst element 31*c* and the catalytic converter 32 may reach a light-off temperature rapidly.

According to an exemplary embodiment, the air supply device may be an active purge pump 43 of an active canister purge system 40.

The active canister purge system 40 may include a canister 42 trapping a fuel vapor generated in a fuel tank 41, and the active purge pump 43 purging the fuel vapor trapped in the canister 42 into the intake pipe 11*a* of the internal combustion engine 11.

The fuel tank 41 may store a fuel. As the fuel is vaporized in the fuel tank 41, the fuel vapor may be generated. The canister 42 may be connected to the fuel tank 41 through a first conduit 44. The fuel vapor generated in the fuel tank 41 may be delivered to the canister 42 through the first conduit 44, and the fuel vapor may be trapped in the canister 42. For example, the canister 42 may have activated carbon.

The canister 42 may have an inlet port 42*a* through which the fuel vapor is introduced, and an outlet port 42*b* through which the fuel vapor is discharged. The inlet port 42*a* may communicate with the fuel tank 41 through the first conduit 44. As the fuel vapor generated in the fuel tank 41 is directed into the canister 42 through the inlet port 42*a*, the fuel vapor may be trapped in the canister 42. The outlet port 42*b* may communicate with the active purge pump 43 through a second conduit 45, and the active purge pump 43 may communicate with the intake pipe 11*a* through a third conduit 46. As the fuel vapor trapped or collected in the canister 42 is discharged through the outlet port 42*b*, the fuel vapor may be purged from the canister 42 into the intake pipe 11*a* of the internal combustion engine 11.

The canister 42 may have a vent port 42*c*, and the vent port 42*c* may communicate with an air isolation valve 50 through a fourth conduit 47. An air inlet 48 may be connected to the air isolation valve 50, and an air filter 49 may be disposed at an end portion of the air inlet 48. For example, the air isolation valve 50 may be opened normally and be closed when a leakage is diagnosed. As the air isolation valve 50 is opened, the ambient air may be directed into the canister 42, and the ambient air together with the fuel vapor may be directed into the intake pipe 11*a* through the active purge pump 43.

The active canister purge system 40 may further include a purge control valve (not shown) disposed between the canister 42 and the active purge pump 43, and the purge control valve may be disposed in the second conduit 45. For example, the purge control valve may be a solenoid valve, and accordingly the purge control valve may be driven in response to a set duty cycle.

When the ambient air temperature T is lower than a threshold Ta in a state in which the hybrid vehicle is parked, the hybrid controller 20 may only drive the motor 12 through the motor controller 22. Accordingly, the vehicle may run in an electric vehicle (EV) mode for a predetermined time t1 at an initial driving stage. The EV mode may be defined as a driving mode in which only the motor 12 provides a propulsion force to the vehicle. That is, when the ambient air temperature T is lower than the threshold Ta in a state in which the hybrid vehicle is parked, the hybrid controller 20 may control the powertrain 10 so that the hybrid vehicle may run in the EV mode at the initial driving stage.

Figure 2:
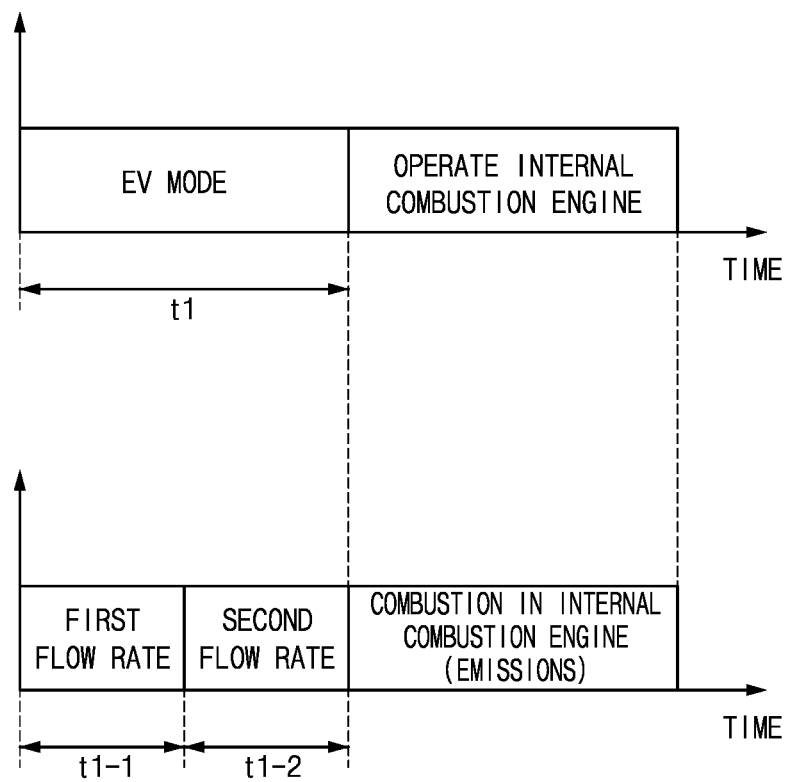
FIG. 2 illustrates a graph of a relationship between ambient air supply and driving mode of a hybrid vehicle according to an exemplary embodiment of the present disclosure.

Referring to FIG. 2, after a vehicle ignition is turned on, the hybrid vehicle may run in the EV mode for the predetermined time t1 at the initial driving stage, and after the EV mode, the internal combustion engine 11 may operate so that the internal combustion engine 11 may provide propulsion power to the vehicle. A vehicle ignition system may include a key ignition system, a keyless ignition system, and/or a wireless ignition system, and the vehicle ignition system is not limited thereto. When the vehicle ignition is on, the power may be provided to various electric/electronic components and controllers of the vehicle.

When the ambient air temperature T is lower than the threshold Ta and the hybrid vehicle is driving in the EV mode, the hybrid controller 20 may control the heating disc 31*b* of the electrically heated catalytic converter 31 to operate, so that the heating disc 31*b* may cause the catalytic converters 31 and 32 disposed in the exhaust pipe 11*b* of the internal combustion engine 11 to reach their light-off temperatures rapidly. When the ambient air temperature T is relatively low, and a predetermined operating time t of the heating disc 31*b* passes, a temperature of the heating disc 31*b* may increase to a limit or threshold temperature c. The limit temperature c may be a temperature at which the heating disc 31*b* is damaged or broken by high-temperature heat. Accordingly, the hybrid controller 20 may control the air supply device and/or the motoring of the internal combustion engine 11 so that the ambient air may be supplied to the heating disc 31*b*. As the ambient air is supplied to the heating disc 31*b*, the heating disc 31*b* which is heated may be appropriately cooled so that the temperature of the heating disc 31*b* may be prevented from increasing to the limit temperature c.

Referring to FIG. 2, while the hybrid vehicle is driving in the EV mode, the ambient air may be supplied to the heating disc 31*b* by the air supply device at a first flow rate during a first operating time t1-1, and then the ambient air may be supplied to the heating disc 31*b* by the operations of the air supply device and the internal combustion engine 11 at a second flow rate during a second operating time t1-2. The second flow rate may be higher than the first flow rate. For example, the first flow rate may be 5 kg/h, and the second flow rate may be 10-15 kg/h. That is, while the heating disc 31*b* is operating, the flow rate of the ambient air supplied to the heating disc 31*b* may be varied as the temperature of the heating disc 31*b* increases, and thus the optimized operation of the heating disc 31*b* may be achieved.

Figure 3:
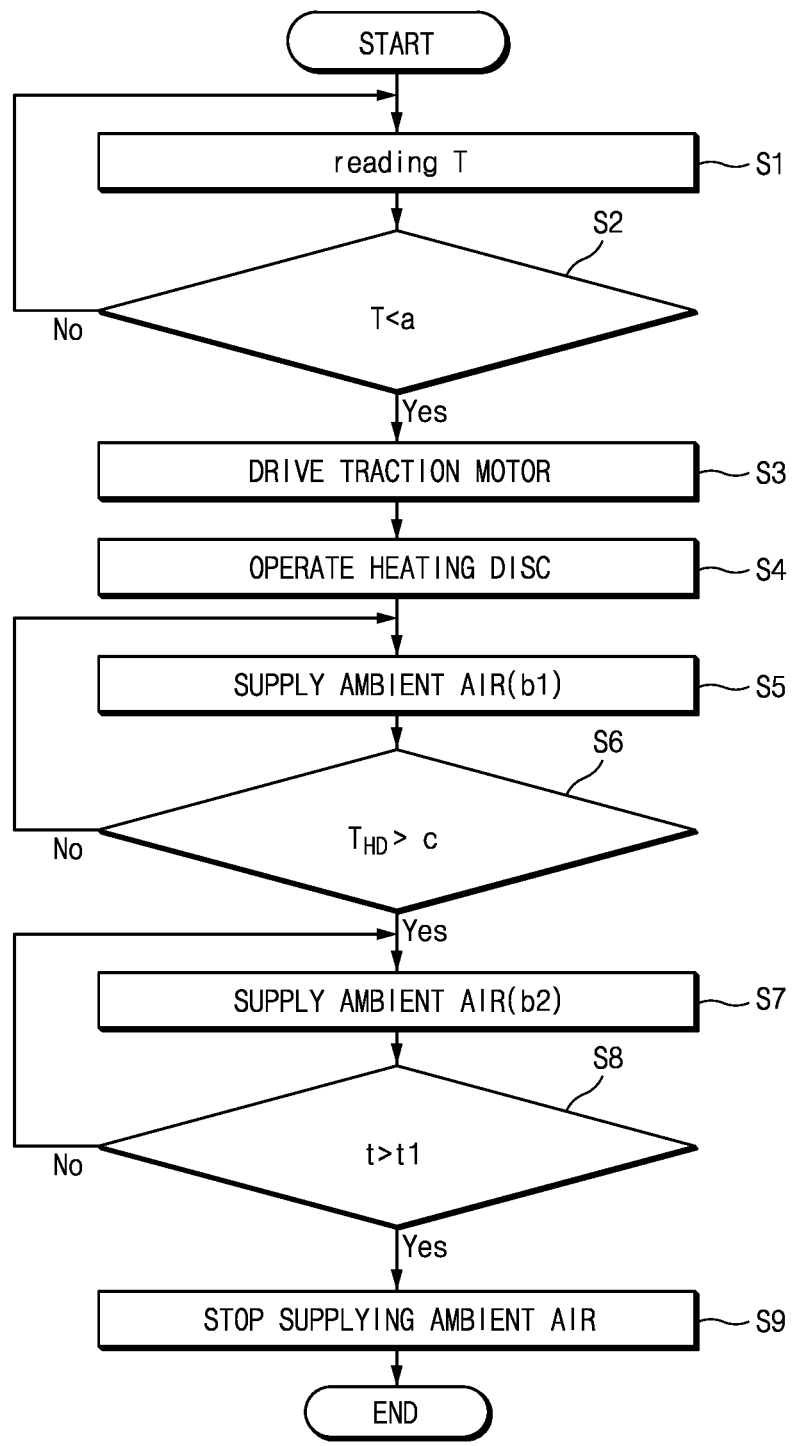
FIG. 3 illustrates a flowchart of a method for controlling a powertrain of a hybrid vehicle according to an exemplary embodiment of the present disclosure.

FIG. 3 illustrates a flowchart of a method for controlling a powertrain of a hybrid vehicle according to an exemplary embodiment of the present disclosure.

Referring to FIG. 3, in a state in which the hybrid vehicle is parked for a predetermined time, the hybrid controller 20 may read an ambient air temperature T sensed by an ambient air sensor of the hybrid vehicle (S1). The ambient air temperature T may be an ambient temperature of the hybrid vehicle in a state in which the hybrid vehicle is parked.

The hybrid controller 20 may determine whether the read ambient air temperature T is lower than a predetermined temperature a (S2). The predetermined temperature a may be a reference temperature at which a cold start condition is satisfied. For example, the predetermined temperature a may be 0° C. When the ambient air temperature T is lower than the predetermined temperature a, the hybrid controller 20 may determine that the cold start condition exists. The cold start condition may be a condition in which a temperature of a coolant circulating in a water jacket of the internal combustion engine is lower than a predetermined temperature.

When the read ambient air temperature T is lower than the predetermined temperature a in S2, the hybrid controller 20 may operate only the motor 12 for a predetermined time t through the motor controller 22 so that the hybrid vehicle may run in the EV mode for the predetermined time t at the initial driving stage (S3). Here, the hybrid controller 20 may control the internal combustion engine 11 through the engine controller 21 so that combustion may not occur in the internal combustion engine 11.

After only the motor 12 is operated, the heating disc 31b of the electrically heated catalytic converter 31 may be operated by the hybrid controller 20 so that the heating disc 31b of the electrically heated catalytic converter 31 may be heated (S4). As the heating disc 31b is operated, the catalyst element 31c of the electrically heated catalytic converter 31 and at least one catalytic converter 32 disposed on the downstream side thereof may be heated, and a temperature of each of the catalytic converters 31 and 32 may rapidly increase to a light-off temperature. Thus, when the hybrid vehicle is driving in the cold start condition, cold start emissions may be effectively reduced.

When the heating disc 31b operates, the air supply device may be controlled by the hybrid controller 20 so that the ambient air may be supplied to the heating disc 31b of the electrically heated catalytic converter 31 at a first flow rate b1 during a first operating time t1-1 (S5). The first operating time t1-1, which is an initial operating time of the heating disc 31b, may be an operating time until a temperature $T_{HD}$ of the heating disc 31b reaches a limit temperature c. That is, while the heating disc 31b is operating, the ambient air may be supplied to the heating disc 31b at the first flow rate b during the first operating time t1-1 before the temperature $T_{HD}$ of the heating disc 31b reaches the limit temperature c. Accordingly, the temperature of the heating disc 31b may be prevented from rising rapidly during the first operating time t1-1, and thus thermal durability of the heating disc 31b may be stably maintained.

The first flow rate b may be determined by the operation of the air supply device. For example, the air supply device may be the active purge pump 43 of the active canister purge system 40. The hybrid controller 20 may control the intake and exhaust system of the internal combustion engine 11 directly/indirectly so that an intake valve 11c and an exhaust valve 11d of the internal combustion engine 11 may be opened to predetermined degrees. As the intake valve 11c and the exhaust valve 11d are opened to the predetermined degrees, the intake pipe 11a and the exhaust pipe 11b may communicate with each other, and accordingly the ambient air may be supplied to the heating disc 31b of the electrically heated catalytic converter 31 through the intake pipe 11a and the exhaust pipe 11b. The hybrid controller 20 may control the operation of the air isolation valve 50 and the operation of the active purge pump 43 directly/indirectly so that the air isolation valve 50 of the active canister purge system 40 may be opened, and RPM of the active purge pump 43 may be appropriately adjusted. As the intake valve 11c and the exhaust valve 11d of the internal combustion engine 11 are opened to the predetermined degrees, and the active purge pump 43 is operated at predetermined RPM, the ambient air may be supplied to the electrically heated catalytic converter 31 through the air inlet 48, the intake pipe 11a of the internal combustion engine 11, the combustion chamber of the internal combustion engine 11, and the exhaust pipe 11b of the internal combustion engine 11. The first flow rate may be determined depending on the RPM of the active purge pump 43, and the first flow rate of the ambient air supplied by the active purge pump 43 may be relatively low since the active purge pump 43 has a limitation in its discharge flow rate. For example, the first flow rate may be 5 kg/h.

As described above, as the ambient air is supplied to the heating disc 31b of the electrically heated catalytic converter 31 by the air supply device at the first flow rate, the temperature of the heating disc 31b may be prevented from rapidly increasing.

After the ambient air is supplied to the heating disc 31b of the electrically heated catalytic converter 31 at the first flow rate, it may be determined whether the temperature of the heating disc 31b exceeds the limit temperature c (S6).

When the temperature of the heating disc 31b exceeds the limit temperature c in S6, the hybrid controller 20 may control the operation of the active purge pump 43 (the air supply device) and the operation of the internal combustion engine 11 so that the ambient air may be supplied to the heating disc 31b of the electrically heated catalytic converter 31 at a second flow rate b2 higher than the first flow rate b1 during a second operating time t1-2 (S7). The hybrid controller 20 may control the intake and exhaust system of the internal combustion engine 11 directly/indirectly so that the intake valve 11c and the exhaust valve 11d of the internal combustion engine 11 may be opened to the predetermined degrees. As the intake valve 11c and the exhaust valve 11d are opened to the predetermined degrees, the intake pipe 11a and the exhaust pipe 11b may communicate with each other, and accordingly the ambient air may be supplied to the heating disc 31b of the electrically heated catalytic converter 31 through the intake pipe 11a and the exhaust pipe 11b. The hybrid controller 20 may control the operation of the air isolation valve 50 and the operation of the active purge pump 43 directly/indirectly so that the air isolation valve 50 of the active canister purge system 40 may be opened and the RPM of the active purge pump 43 may be appropriately adjusted, and thus the ambient air may be supplied to the electrically heated catalytic converter 31 through the air inlet 48, the intake pipe 11a of the internal combustion engine 11, the combustion chamber of the internal combustion engine 11, and the exhaust pipe 11b of the internal combustion engine 11. In addition, the ambient air may be additionally supplied to the electrically heated catalytic converter 31 through the motoring of the internal combustion engine 11. The motoring of the internal combustion engine 11 may be defined as cranking of the internal combustion engine 11 by the starter 15 in a state in which the intake valve 11c and the exhaust valve 11d of the internal combustion engine 11 are opened to the predetermined degrees and the fuel is not supplied to the internal combustion engine 11. Since the fuel is not supplied to the internal combustion engine 11, combustion does not occur in the internal combustion engine 11. The ambient air may be supplied to the heating disc 31b of the electrically heated catalytic converter 31 by the motoring of the internal combustion engine 11 through the intake pipe 11a of the internal combustion engine 11, the combustion chamber of the internal combustion engine 11, and the exhaust pipe 11b of the internal combustion engine 11. The second flow rate b2 may be the sum of the flow rate of the ambient air supplied by the operation of the active purge pump 43 and the flow rate of the ambient air additionally supplied by the motoring of the internal combustion engine 11. Since the ambient air is supplied to the heating disc 31b through the operation of the active purge pump 43 and the motoring of the internal combustion engine 11, the second flow rate b2 may be relatively greater than the first flow rate b1. For example, the second flow rate b2 may be 10-15 kg/h.

After the ambient air is supplied to the heating disc 31b of the electrically heated catalytic converter 31 at the second flow rate, the hybrid controller 20 may determine whether an operating time t of the heating disc 31b of the electrically heated catalytic converter 31 exceeds a predetermined time t1 (S8).

When the operating time t of the heating disc 31b exceeds the predetermined time t1, the hybrid controller 20 may control the active purge pump 43 and the internal combustion engine 11 to stop, so that the supply of the ambient air to the heating disc 31b of the electrically heated catalytic converter 31 may be stopped (S9). Referring to FIG. 2, the operating time t of the heating disc 31b may be a time during which the hybrid vehicle operates in the EV mode.

Figure 4:
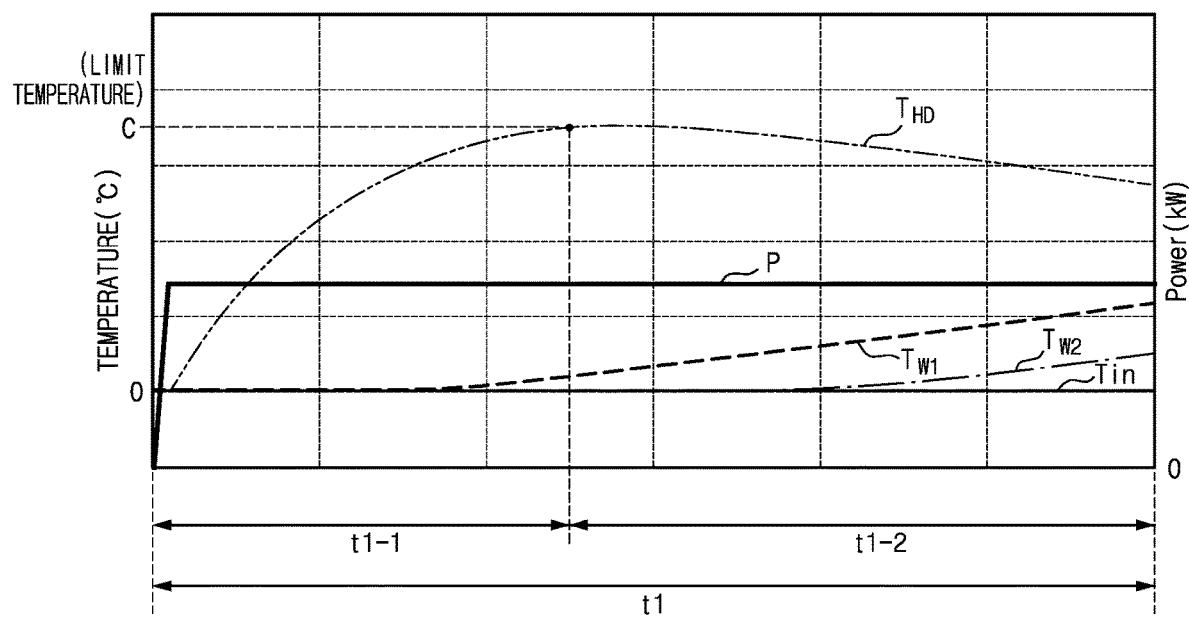
FIG. 4 illustrates a graph of temperatures of a heating disc and catalytic converters of a powertrain when a hybrid vehicle runs in electric vehicle (EV) mode.

Referring to FIG. 4, while the hybrid vehicle is driving in the EV mode at the initial driving stage, power may be constantly supplied to the heating disc 31b of the electrically heated catalytic converter 31 (see line P), and accordingly the temperature of the heating disc 31b may increase during the first operating time t1-1. Here, as the ambient air is supplied to the heating disc 31b at the first flow rate during the first operating time t1-1, the temperature of the heating disc 31b may gradually increase. Then, when the temperature of the heating disc 31b reaches the limit temperature c, the ambient air may be supplied to the heating disc 31b at the second flow rate during the second operating time t1-2, and accordingly the temperature of the heating disc 31b may be gradually lowered than the limit temperature c (see line $T_{HD}$). Here, as the heating disc 31b is operating during the predetermined operating time t1, a temperature (see line $T_{w1}$) of the catalyst element 31c of the electrically heated catalytic converter 31 and a temperature (see line $T_{w2}$) of the catalytic converter 32 disposed downstream of the electrically heated catalytic converter 31 may gradually increase.

As set forth above, the method for controlling a powertrain of a hybrid vehicle according to exemplary embodiments of the present disclosure may meet stricter emissions standards by achieving rapid activation of the catalyst and preventing the heating disc of the electrically heated catalytic converter from overheating.

According to exemplary embodiments of the present disclosure, when the ambient air temperature is lower than the predetermined temperature at which the cold start condition is satisfied, the hybrid vehicle may run in the EV mode by the motor at the initial driving stage, and the catalyst element of the electrically heated catalytic converter and at least one catalytic converter disposed downstream of the electrically heated catalytic converter may rapidly reach the light-off temperature by the heating disc, and thus emissions may be reduced. In particular, the flow rate of the ambient air supplied to the heating disc may be varied in response to the temperature change of the heating disc, which may prevent the temperature of the heating disc from increasing above the limit temperature. Thus, the thermal durability of the heating disc may be improved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for controlling a powertrain of a hybrid vehicle including an internal combustion engine and a motor, the method comprising:
   determining, by a hybrid controller, whether an ambient air temperature is lower than a predetermined temperature;
   driving, by the hybrid controller, the motor when the ambient air temperature is lower than the predetermined temperature;
   operating, by the hybrid controller, a heating disc of an electrically heated catalytic converter of an internal combustion engine;
   supplying, by the hybrid controller, ambient air to the heating disc at a first flow rate while operating the heating disc;
   determining, by the hybrid controller, whether a temperature of the heating disc exceeds a limit temperature; and
   when the temperature of the heating disc exceeds the limit temperature, supplying, by the hybrid controller, the ambient air to the heating disc at a second flow rate higher than the first flow rate to lower the temperature of the heating disc.

2. The method according to claim 1,
   wherein the ambient air supplied to the heating disc is maintained at the first flow rate during a predetermined first operating time when the temperature of the heating disc is lower than or equal to the limit temperature.

3. The method according to claim 2, wherein the first flow rate is determined by an air supply device, and
   the air supply device is an active purge pump of an active canister purge system.

4. The method according to claim 2, wherein the ambient air is supplied to the heating disc at the first flow rate when the active purge pump operates in a state in which an intake valve and an exhaust valve of the internal combustion engine are opened to predetermined degrees.

5. The method according to claim 3, wherein the active canister purge system includes a canister fluidly connected to an intake pipe of the internal combustion engine, an air isolation valve connected to the canister, and an air inlet connected to the air isolation valve,
   the active purge pump is disposed between the canister and the intake pipe, and
   as the air isolation valve is opened and the active purge pump is operated, the ambient air is supplied to the heating disc through the air inlet, the intake pipe of the internal combustion engine, a combustion chamber of the internal combustion engine, and an exhaust pipe of the internal combustion engine.

6. The method according to claim 2, wherein the ambient air supplied to the heating disc is maintained at the second flow rate during a predetermined second operating time when the temperature of the heating disc exceeds the limit temperature, and
   the second flow rate is greater than the first flow rate.

7. The method according to claim 5, wherein the second flow rate is determined by the active purge pump and motoring of the internal combustion engine, and
   the motoring of the internal combustion engine is defined as cranking of the internal combustion engine by a starter in a state in which the intake pipe and the exhaust pipe of the internal combustion engine communicate with each other and a fuel is not supplied to the internal combustion engine.

8. A non-transitory computer readable medium containing program instructions executed by a processor, the computer readable medium comprising:
   program instructions that determine whether an ambient air temperature is lower than a predetermined temperature;
   program instructions that drive the motor when the ambient air temperature is lower than the predetermined temperature;

program instructions that operate a heating disc of an electrically heated catalytic converter of an internal combustion engine;
program instructions that supply ambient air to the heating disc at a first flow rate while operating the heating disc;
program instructions that determine whether a temperature of the heating disc exceeds a limit temperature; and
program instructions that supply the ambient air to the heating disc at a second flow rate higher than the first flow rate to lower the temperature of the heating disc, when the temperature of the heating disc exceeds the limit temperature.

\* \* \* \* \*